United States Patent Office 3,553,181
Patented Jan. 5, 1971

3,553,181
PROCESS FOR THE POLYMERIZATION AND COPOLYMERIZATION OF OLEFINS
André Delbouille, Brussels, and Jean-Louis Deroitte, Barvaux-sur-Ourthe, Belgium, assignors to Solvay & Cie, Brussels, Belgium, a Belgian corporation
No Drawing. Filed Nov. 16, 1967, Ser. No. 683,492
Claims priority, application France, Nov. 18, 1966, 84,118
Int. Cl. C08f 15/40
U.S. Cl. 260—80.78          10 Claims

ABSTRACT OF THE DISCLOSURE

Olefins and diolefins are polymerized and copolymerized in the presence of a catalyst which is obtained by reacting a transition metal compound with macromolecular nitrogenous compound which is substantially free of hydroxyl groups and then activating the thus obtained product with an organometallic compound.

BACKGROUND OF INVENTION

The present invention is directed to a process for the polymerization of olefins and for the copolymerization of olefins with one another and/or with diolefins in the presence of new solid catalysts.

It has been proposed previously to polymerize ethylene in the presence of a catalyst comprising an organometallic compound and a derivative of a transition metal which are deposited on an inert support which may be, for example, preformed polyethylene (Belgian Pat. No. 552,550). In this process, the catalyst is simply deposited on the surface of the macromolecular compound and may be eliminated therefrom by any physical means such as by washing.

Another process for preparing catalyst consists in chemically bonding the catalyst to a macromolecular compound having reactive groups. A number of catalysts capable of chemical bonding have been described in the prior art.

One type of chemically bonded catalyst, the bonding of a derivative of a transition metal on a macromolecular support has been carried out by means of hydroxyl groups. French Pat. No. 1,405,371 is directed to catalysts which are chemically bonded to a copolymer of vinyl alcohol containing 1 to 20 mole percent of polymerized vinyl alcohol in its molecule. In the process described in French Pat. No. 1,475,927, of Feb. 24, 1966, the macromolecular support on which the derivative of the transition metal is chemically bonded is a hydroxylated polycondensation product derived from formol and an amino compound.

It has also been discovered that the bonding of the transition metal compounds on macromolecular compounds can be carried out by using the reactive groups constituted by carbon-carbon double bonds, according to Belgian Pat. No. 681,400 of May 23, 1966.

SUMMARY OF INVENTION

It has now been found that transition metal compounds may also be bonded to nitrogenous macromolecular compounds which are free of hydroxyl groups. After activation of the resulting products with metals, hydrides, or organometallic compounds of Groups I to III of the Periodic Table catalysts are obtained which are useful for the polymerization of olefins and which exhibit very interesting properties.

According to the present invention, the polymerization of olefins and the copolymerization of olefins with one another and/or with diolefins is carried out in the presence of a catalyst which is the reaction product of one or more transition metal compounds and a nitrogenous macromolecular compound which is substantially free of hydroxyl groups. The nitrogenous compound is activated by a metal, a hydride or an organometallic compound of the metals of Groups I to III of the Periodic Table.

DESCRIPTION OF THE PREFERRED EMBODIMENTS

The nitrogenous macromolecular compounds which may be used in the process according to the invention contain less than 3% by weight of hydroxyl groups. They are preferably selected from the group consisting of the compounds having amino, imino, amido, imido, urethane, nitrile and nitro groups. These reactive groups may be located on the lateral chain or, whenever possible, on the main polymeric chain. They may also be located in heterocyclic nuclei.

The nitrogeonus macromolecular compounds which are preferably used to prepare the new catalysts are polyamides, polyurethanes, polyacrylamides and polymers derived from a vinyl group containing heterocyclic nitrogenous compounds.

The transition metal compounds which may be used for the preparation of the new catalysts are preferably selected from the group consisting of the halogenated derivatives of the metals of Groups IVb, Vb and VIb of the Periodic Table and more particularly, the halides, oxyhalides and alkoxyhalides of titanium and vanadium. Examples of transition metal compounds suitable for use in the preparation of the catalysts of this invention include titanium tetrachloride ($TiCl_4$), vanadium tetrachloride ($VCl_4$), zirconium tetrachloride ($ZrCl_4$) vanadium oxytrichloride ($VOCl_3$), chromium oxychloride ($CrO_2Cl_2$), zirconium oxychloride ($ZrOCl_2$), and titanium trichlorbutoxide ($TiCl_3[OC_4H_9]$). In addition, alkoxides and oxyalkoxides, such as titanium tetrabutoxide ($Ti[OC_4H_9]_4$), and vanadyl tributoxide ($VO[OC_4H_9]_3$), and acetylacetonates, such as vanadyl acetylacetonate ($VO[C_5H_7O_2]_2$), chromium acetylacetonate ($Cr[C_5H_7O_2]_3$), and zirconium acetylacetonate ($Zr[C_5H_7O_2]_4$) also exemplify useful types of transition metal compounds which may be used in the preparation of the new catalysts. Combinations of two or more of the above compounds may also be used, such mixed catalysts having in some cases improved activities or properties over the simple catalysts.

The mechanism of the reaction between the transition metal compounds and the nitrogenous macromolecular compounds is not known with certainty.

However, it is believed that complexes are formed the structure of which is similar to that of the well known complexes of the compounds of the transition elements with some nitrogenous compounds such as with amines, amides, nitriles and nitro compounds.

In the preparation of the catalysts according to the invention, there is no quantitative formation of complexes between all the reactive groups of the macromolecular compound and the transition metal compound. On the contrary, the formation of complexes is limited to some specific sites on the surface of the macromolecular support.

Nevertheless, it has been observed that at the end of the reaction, the compound of the transition element is chemically bonded to the support and cannot be eliminated therefrom by physical means. For example, by washing the reaction product of a transition metal compound and a nitrogenous macromolecular compound with an inert solvent, such as a hydrocarbon which is a good solvent of the transition metal compound, the latter cannot be eliminated. On the other hand, a solvent having a high complexing power, for example tetrahydrofuran, which dissociates the resulting complex, as might be expected, would completely eliminate the transition metal compound.

The reaction between the compound of a transition element and the nitrogenous macromolecular compound should be carried out in the absence of moisture. For example, the reaction may be carried out by raising to its boiling point, the temperature of a suspension of the nitrogenous macromolecular compound in a hydrocarbon, such as hexane, xylene, tetraline or carbon tetrachloride, containing dissolved therein, the transition metal compound. The reaction may also be carried out by directly suspending the nitrogen containing macromolecular compound in the pure transition metal compound when the latter is a liquid.

The reaction is generally carried out at a temperature between 20 and 150° C. The temperature for the reaction is raised if at a lower temperature insufficient bonding results. However, a temperature which is too high may lead to degradation of the macromolecular compound.

The reaction product of a transition metal compound and the nitrogenous macromolecular compound is carefully washed by using an anhydrous hydrocarbon solvent until all traces of the transition element have been eliminated from the washing solvent.

As a result, a solid catalytic complex is obtained which is insoluble in the hydrocarbons and which is therefore particularly suitable for the polymerization of olefins in hydrocarbon media to produce polymers as solid particles which are not dissolved in these media.

The solid catalytic complex should be activated by contact with a metal, a hydride or an organometallic compound of the metals of Groups I, II and III of the Periodic Table. Trialkylaluminum and alkylaluminum halides are particularly suitable activators. However, other metals, hydrides and organometallic compounds of particularly Groups I$a$, II$a$, II$b$, and III$a$ of the Periodic Table may be used, for example, butyl lithium (LiC$_4$H$_9$), diethylmagnesium (Mg[C$_2$H$_5$]$_2$), diethylzinc

triethylaluminum (Al[C$_2$H$_5$]$_3$), tri - n - propylaluminum (Al[nC$_3$H$_7$]$_3$), triisobutylaluminum (Al[iC$_4$H$_9$]$_3$), diethylaluminum monochloride (Al[C$_2$H$_5$]$_2$Cl), diisobutylaluminum monochloride (Al[iC$_4$H$_9$]$_2$Cl), and diethylaluminum monobromide (Al[C$_2$H$_5$]$_2$Br).

The activation may be carried out immediately before the introduction of the monomers. The catalyst may be matured for a more or less extended period of time, at room temperature or at a higher temperature.

The process according to the prevent invention may be used for the polymerization of olefins and the copolymerization of olefins with one another and/or with diolefins and particularly for the production of polyethylene, polypropylene, ethylene-propylene and ethylene-butadiene copolymers and terpolymers of ethylene, propylene and non-conjugated diene. The new catalysts according to the invention, have increased activities and the polymers produced therewith have improved properties.

By using the catalysts according to the invention for the polymerization of ethylene, it is possible to obtain a polyethylene having a high linearity and a density higher than 0.96 g./cm.$^3$. The linearity of the product is such that it contains less than one CH$_3$ group per 1000 carbon atoms. The products contains 0.05 to 0.2 vinyl groups per 1000 carbon atoms and less than 0.05 trans-internal and vinylidene double bonds per 1000 carbon atoms.

By using the new catalyst of the invention for copolymerizing ethylene with higher olefins and especially propylene, polymers having a lower density have been obtained. However, in this case, the activity of these catalysts is highly increased. They are highly suitable for the production of thermoplastic ethylene copolymers having a low content of propylene.

The new catalysts are particularly interesting for the production of elastomeric copolymers of ethylene and propylene. They may be used for the copolymerization of ethylene and propylene in the absence of solvent when in admixture with the liquid monomers. The products so obtained are characterized by an amorphous structure and by excellent elastomeric properties, where as the products manufactured under similar conditions by the use of known catalysts comprising the same organometallic activator and the same compound of a transition element which is not bonded on a macromolecular compound have a noted crystallinity and are very poor elastomers.

It has been found particularly advantageous to use mixed catalysts derived from titanium and vanadium which are jointly fixed on the nitrogenous macromolecular compound for the copolymerization of ethylene and propylene and for the production of ethylene-propylene-non-conjugated diene terpolymers.

The process according to the invention may be used for the copolymerization of non-conjugated dienes with one or more monoolefins such as ethylene propylene or butene-1.

The non-conjugated dienes which may be used in the process according to the invention may be selected from the following:

The non-conjugated aliphatic dienes, such as pentadiene-1,4, hexadiene-1,4, hexadiene-1,5.

The monocyclic dienes, such as 4-vinylcyclohexene, 1,3-divinylcyclohexene, cycloheptadiene-1,4, cyclooctadiene-1,5.

The non-conjugated alicyclic dienes having an endocyclic bridge such as dicyclopentadiene and norbornadiene.

Particularly interesting terpolymers which may be used as sulphur vulcanizable elastomers and which may be obtained by using the new catalysts according to the invention are the ethylene-propylene-dicyclopentadiene and the ethylene-propylene-hexadiene-1,4, terpolymers.

The catalysts according to the invention are also suitable for the copolymerization of olefins with conjugated diolefins.

The polymerization and the copolymerization may be carried out according to any known procedures in the gaseous phase, in the absence of any liquid medium which is a solvent of the monomer, or in the presence of a dispersion medium in which the monomer is soluble. An inert hydrocarbon which is liquid under the conditions of polymerization or the monomer itself maintained in a liquid state under its saturation pressure may be used as liquid dispersion medium.

The following examples are given to further illustrate the best mode contemplated for carrying out the invention, but are not to be interpreted as limiting or restricting the scope of this invention in any manner whatsoever.

EXAMPLES 1 TO 5

(a) Example 1—Preparation of catalyst

Into a cylindrical reactor heated by means of a double jacket, provided with an agitator and having a sintered glass plate at the lower portion thereof, there were introduced 60 ml. of TiCl$_4$ and 12 g. of a high molecular weight polycondensation product derived from ω-aminodecanoic acid, sold under the trademark Rilsan 80/200. This product melts at 186° C. and has a relative viscosity of 1.39 when measured at 20° C. in a 5 g./l. solution in sulphuric acid.

The suspension is maintained at a temperature of approximately 25° C. for one hour after which a solid product is separated and washed thoroughly with anhydrous hexane until all traces of TiCl$_4$ have been eliminated from the washing solvent.

The product is a clear yellow solid which contains 23 g. of titanium per kilogram.

(b) Example 2—Polymerization

Into a 3 liter stainless steel autoclave which has been dried and flushed with dry ethylene, there are successively introduced 5 ml. of a solution containing 200 g. per liter of tri n-propyl-aluminum in hexane, 565 mg. of the solid catalyst described in Example 1 and 1 liter of pure, dry hexane.

The mixture is heated at 80° C. and the ethylene pressure is raised 10 kg./cm.$^2$. The pressure is maintained constant by continuously introducing ethylene. After two hours, the autoclave is opened and 115 g. of polyethylene is collected which corresponds to a catalytic activity of 450 g. of PE/h.g. of Ti atm. $C_2H_4$.

The resulting polyethylene was examined by infrared spectro-analysis. It contains less than 1 methyl group, less than 0.01 transinternal double bond, 0.07 vinyl double bonds and 0.01 vinylidene double bonds per 1000 carbon atoms.

(c) Examples 3 and 4—Copolymerization

Into a 5 liter stainless steel autoclave dried and flushed with propylene, there were introduced a solution of 100 g./l. of triisobutylaluminum in hexane, the product prepared as in Example 1, hydrogen at a partial pressure of 0.2 kg./cm.$^2$ and 1.116 kg. of propylene. The mixture is heated to 40° C. while introducing ethylene in order to provide a total pressure of 19.3 kg./cm.$^2$. The result is a solution containing 7.5 mole percent of ethylene in liquid propylene.

After four hours, the gases are removed from the monomers which have not reacted and a copolymer of ethylene and propylene is collected.

The reaction conditions and the data concerning the resulting products are given in Table 1 below.

TABLE 1

| | Solid catalyst | | | | Catalytic | Propylene |
|---|---|---|---|---|---|---|
| | Total content, g. | TiCl$_4$ content, mg. | Al(iBu)$_3$, g. | Weight of copolymer produced, g. | activity, g. copolymer, g. TiCl$_4$.h | content of copolymer, mole percent |
| Sample No.: | | | | | | |
| 3 | 0.550 | 50 | 1 | 210 | 1,050 | 35 |
| 4 | 0.555 | 50.5 | 0.2 | 325 | 1,609 | 41 |

EXAMPLES 5 TO 7

(a) Example 5—Preparation of catalyst

There is formed a suspension of 7.4 g. of the polyamide used in Examples 1 to 4, in 4 ml. of VOCl$_3$ and 40 ml. of hexane. The mixture is maintained at a temperature of 25° C. for 10 minutes. A solid is separated and washed extensively with hexane until all traces of VOCl$_3$ in the washing solvent have been eliminated and the product is dried under vacuum.

There is obtained a dark brown solid catalyst containing 71.4 g. of VOCl$_3$ per kilogram.

(b) Example 6—Copolymerization of ethylene and propylene

The copolymerization of ethylene is carried out under the conditions set forth in Examples 3 and 4 by using 1.369 g. of the solid catalyst prepared in Example 5 and 0.500 g. of triisobutylaluminum.

After 4 hours, there is obtained 39 g. of a copolymer of ethylene and propylene containing 42 mole percent of propylene. The activity of the catalyst, expressed in g. of the copolymer produced per g. VOCl$_3$ used and per hour is of 100.

(c) Example 7—Copolymerization of ethylene with propylene and dicyclopentadiene Into a 1.5 liter autoclave, dried and flushed with propylene, there were successively introduced 0.830 g. of triisobutylaluminum in solution in hexane, 1.550 g. of the catalyst prepared according to Example 5, 10.5 g. of dicyclopentadiene and 338 g. of liquid propylene.

The mixture is stirred and the temperature of the autoclave is raised to 40° C. Ethylene is gradually introduced so as to obtain a constant total pressure of 19.2 kg./cm.$^2$. The liquid phase contains 7.5 mole of ethylene per 100 mole of ethylene and propylene.

After two hours, the gases are removed from the autoclave, the resulting product is separated and it is treated with water vapor to eliminate dicyclopentadiene. The product is dried under vacuum at 50° C.

There is collected 64 g. of a terpolymer of ethylene-propylene-dicyclopentadiene.

The catalytic activity is 290 g. of terpolymer per hour and per g. of VOCl$_3$.

EXAMPLES 8 TO 10

(a) Example 8—Preparation of catalyst 9.1 g. of the polyamide used in Example 1 are combined with 40 ml. of TiCl$_4$ and 11.2 ml. of VOCl$_3$. The mixture is maintained at 25° C. for 30 minutes. It is washed carefully with 1 liter of hexane and dried under vacuum. There is obtained a catalyst having bonded thereon 43.6 g. of TiCl$_4$ and 7.1 g. of VOCl$_3$ per kg. of the mixture.

(b) Example 9—Copolymerization 1.89 g. of this catalyst and 0.500 g. of triisobutylaluminum are used for the copolymerization of ethylene and propylene under the conditions described in Examples 3 and 4. After a reaction period of 4 hours, there is obtained 562 g. of a copolymer having a propylene content of 52 mole percent. The activity of the catalyst expressed as above is 1800.

(c) Example 10—Terpolymerization 0.674 g. of the above catalyst and 0.360 g. of Al(iBu)$_3$ are used for the copolymerization of ethylene, propylene and dicyclopentadiene under the conditions set forth in Example 7. After one hour and 50 minutes, there is obtained 114 g. of a terpolymer. This terpolymer was vulcanized by using a sulphur containing vulcanizing agent. The activity of the catalyst expressed in g. of terpolymer produced per hour and per g. of the compound of the transition elements is 2680. The propylene content of the product is 43 mole percent and its unsaturation is 0.25 C=C groups g./kg.

EXAMPLE 11

7.8 g. of a powdered polycondensation product derived from adipic acid and hexamethylene diamine having a melting point of 250° C. and sold under the trademark Ultramid A 3 K by BASF were dried for two hours under vacuum at 60° C. The powder is introduced with 50 ml. of pure TiCl$_4$ into the apparatus described in Example 1. The mixture is stirred and heated up to 100° C. during one hour and the reaction is carried out for one more hour at this temperature.

The mixture is cooled, the solid is separated therefrom and is washed thoroughly with hexane until all traces of the chloride in the washing solvent have disappeared. The catalytic complex contains 72 g. of Ti and 210 g. of Cl per kilogram, which corresponds to an atomic ratio chlorine/titanium of 3.95.

0.158 g. of this catalyst and 0.500 g. of Al(iBu)$_3$ are used for the copolymerization of ethylene and propylene under the conditions set forth in Examples 3 and 4. After four hours, there are obtained 53 g. of a copolymer having a propylene content of 36 mole per 100 mole of the copolymer. The catalytic activity is 294 g. of the copolymer/g. of $TiCl_4$ and per hour.

EXAMPLE 12

5 g. of a polyamide similar to the one used in Example 11 were dried under a vacuum at 60° C. for two hours and the resulting powder is introduced into an apparatus as described in Example 1. 25 ml. of pure $VOCl_3$ are added thereto and the reaction is carried out for a period of 2 hours at room temperature. The product becomes dark brown. The solid is separated, washed carefully with pentane and dried.

There is obtained a product containing 20 g. of V per kilogram.

1.52 g. of the above solid catalyst and 0.5 g. of $Al(iBu)_3$ were used to copolymerize ethylene and propylene according to the process set forth in Examples 3 and 4.

After four hours, there is obtained 88 g. of a copolymer containing 27 mole percent of propylene.

The catalytic activity is 214 g. of copolymer per hour and per g. of $VOCl_3$.

EXAMPLE 13

6 g. of a polyurethane produced from butanediol-1,4 and hexamethylene diisocyanate and which melts at 180–185° C. are dried under vacuum for a period of one hour at 60° C. This product is sold by Bayer under the trademark Durethan Uo.

A suspension of the dried powder in 60 ml. of $TiCl_4$ is formed and the mixture is stirred and heated to 85° C. during one hour. The suspension is maintained at that temperature for a period of one hour and is thereafter cooled. The solid is separated and washed thoroughly with pure, dry hexane before drying it.

The product contains 46 g. of Ti and 130 g. of Cl per kilogram which corresponds to an atomic ratio Cl/Ti of 3.82.

The copolymerization of ethylene and propylene under the conditions set forth in Examples 3 and 4 with 0.318 g. of the above solid catalyst and 0.700 g. of triisobutyl-aluminum has resulted in 140 g. of a copolymer containing 40 mole percent of propylene. The catalytic activity is 604 g. of the coplolymer per g. of $TiCl_4$ and per hour.

EXAMPLES 14 TO 19

(a) Examples 14–19—Preparation of catalysts

Catalysts were prepared by reacting nitrogen containing polymers with $TiCl_4$ in an apparatus and according to the process described in Example 1. The reaction conditions and the properties of the resulting products are given in Table 2 below.

TABLE 2

| Example No.: | Nitrogenous polymer Formula | Name | Quantity, g. | $TiCl_4$, ml. | Reaction temperature, °C. | Length of reaction, min. | Titanium content after the reaction, g./kg. | Quantity of bounded $TiCl_4$, g./kg. |
|---|---|---|---|---|---|---|---|---|
| 14 | $-[-CH_2-CH-]_n$ $\qquad CONH_2$ | Polyacrylamide 100 (American Cyanamid). | 2.74 | 30 | 120 | 60 | 2 | 8 |
| 15 | $-[-CH_2-CH-]_n$ $\qquad CN$ | Poly(acrylonitrile)* | 9.8 | 50 | 125 | 60 | 4.3 | 17 |
| 16 | (polyvinylcarbazole structure) | Polyvinylcarbazole, Luvican M 170 (BASF). | 11.5 | 50 | 80 | 60 | 15 | 59.4 |

*Obtained by suspension polymerization in the presence of lauroyl peroxide at 60° C. for 3 hours. Intrinsic viscosity measured at 20° C. in dimethylformamide: 0.75 l./gr.

(b) Examples 17–19—Copolymerization of ethylene and propylene

The solid catalysts as prepared in (a) have been used to carry out the copolymerization of ethylene and propylene under the conditions specified in Examples 3 and 4. The specific reaction conditions and the characteristics of the resulting products are given in Table 3 below.

TABLE 3

| | Catalyst | | | | | Activity of | Propylene content |
|---|---|---|---|---|---|---|---|
| Example No.: | Preparation according to Example No. | Total quantity, g. | Quantity of $TiCl_4$, mg. | $Al(iBu)_3$, g. | Weight of copolymer, produced, g. | catalyst, g. of copolymer, g. $TiCl_4$.h | of the copolymer, mole percent |
| 17 | 14 | 2.41 | 19.3 | 0.5 | 22.5 | 294 | 22 |
| 18 | 15 | 2.60 | 44.2 | 0.5 | 10 | 56.5 | -- |
| 19 | 16 | 0.694 | 41.2 | 0.5 | 269 | 1,632 | 36 |

What we claim and desire to secure by Letters Patent is:

1. Process for the polymerization and the copolymerization of olefins and non-conjugated dienes wherein the reaction is carried out in the presence of a catalyst consisting essentially of the reaction product of at least one transition metal compound and a solid nitrogenous macromolecular compound free of hydroxyl groups which is selected from the group consisting of polyamides, polyurethanes, polyacrylamides and poly(vinyl-substituted nitrogen heterocyclic) compounds, said reaction product being activated by a metal, a hydride, or an organometallic compound of the metals of Groups I to III of the Periodic Table.

2. Process according to claim 1 in which said transition metal compound is selected from the group consisting of halides, oxyhalides, alkoxyhalides, alkoxides, oxyalkoxides and acetyl acetonates.

3. Process according to claim 1 in which the transition metal compounds are halogenated derivatives of the metals of the Groups IVb, Vb and VIb of the Periodic Table.

4. Process according to claim 1, in which the compounds of the transition metals are selected from the group consisting of halides, oxyhalides and alkoxyhalides, alkoxides, oxyalkoxides and acetyl acetonates of titanium and vanadium.

5. Process according to claim 1 in which the activator is an alkyl aluminum or an alkyl aluminum halide.

6. Process according to claim 1 in which the reaction is the polymerization of ethylene, propylene and butene.

7. Process according to claim 1 in which the reaction is the copolymerization of ethylene and propylene.

8. Process according to claim 1 in which the reaction is the copolymerization of ethylene, propylene and a non-conjugated diene.

9. A hydrocarbon insoluble polymerization catalyst comprising the reaction product of a transition metal compound and a solid nitrogenous macromolecular compound free of hydroxyl groups which is selected from the group consisting of polyamides, polyurethanes, polyacrylamides and the polymers derived from vinyl substituted nitrogen heterocyclic compounds.

10. A polymerization catalyst which comprise the reaction product prepared by activating the catalysts defined in claim 9, with a metal, a hydride or an organometallic compound of the metals of Groups I to III of the Periodic Table.

References Cited
UNITED STATES PATENTS 3,396,155   8/1968   Toussant et al. _____ 260—80.78

JOSEPH L. SCHOFER, Primary Examiner

R. S. BENJAMIN, Assistant Examiner

U.S. Cl. X.R.

260—88.2; 252—431; 260—93.7, 94.9, 878